United States Patent [19]

Mischenko

[11] 4,420,232

[45] Dec. 13, 1983

[54] SELECTIVELY POSITIONABLE SLIDE TRAY POSITION SENSING ARRANGEMENT FOR SLIDE PROJECTOR APPARATUS

[75] Inventor: Nicholas Mischenko, Mount Prospect, Ill.

[73] Assignee: Bell & Howell Company, Chicago, Ill.

[21] Appl. No.: 336,466

[22] Filed: Dec. 31, 1981

[51] Int. Cl.³ .............................................. G03B 23/04
[52] U.S. Cl. ........................................ 353/25; 353/103; 353/117
[58] Field of Search .................... 353/25, 26 A, 27 A, 353/103, 117, 104; 340/870.29, 875.36, 825.56; 250/231 SE

[56] References Cited

U.S. PATENT DOCUMENTS

| | | | |
|---|---|---|---|
| 3,178,998 | 4/1965 | King | 353/104 X |
| 3,895,864 | 7/1975 | Uchidoi et al. | 353/25 |
| 4,041,457 | 8/1977 | Koch | 353/26 A X |
| 4,240,066 | 12/1980 | Lenox | 340/870.29 |
| 4,353,642 | 10/1982 | Weigert | 353/25 |
| 4,358,753 | 11/1982 | Cascini | 340/870.29 X |

FOREIGN PATENT DOCUMENTS

1937765 9/1970 Fed. Rep. of Germany ...................... 340/870.29

Primary Examiner—Harry N. Haroian
Attorney, Agent, or Firm—James V. Lapacek; Robert J. Schneider; Roger M. Fitz-Gerald

[57] ABSTRACT

A slide tray position sensing arrangement is provided for slide projector apparatus. The slide tray position sensing arrangement is arranged at a detection station. A coded aperture ring is provided that moves in a manner correlated to the movement of a slide tray turntable. The slide tray turntable carries the slide tray that holds the slides for projection and also functions as a tray transport arrangement. The coded aperture ring includes two circumferential arrays of apertures. Each of the apertures in the first array corresponds to a controlled slide position of a first tray type; e.g., an 80 slide position tray. Each of the apertures in the second array corresponds to a controlled slide position of a second tray type; e.g., a 140 slide position tray. The slide tray position sensing arrangement is responsive to a predetermined portion of a 140 slide position tray to selectively condition the position sensing arrangement to a second detection position in alignment with the path of travel of the second aperture array. The first detection position of the position sensing arrangement is aligned with the first aperture array for 80 slide position tray operation.

16 Claims, 7 Drawing Figures

SELECTIVELY POSITIONABLE SLIDE TRAY POSITION SENSING ARRANGEMENT FOR SLIDE PROJECTOR APPARATUS

BACKGROUND OF THE INVENTION

A. Field of the Invention

The present invention relates generally to slide projectors and more particularly to a selectively positionable slide tray position sensing arrangement that is selectively positionable between two detection positions in response to the type of slide tray positioned on the slide projector as sensed by the position sensing arrangement.

B. Description of the Prior Art

Various control apparatus are known for slide projectors to control positioning of the slide tray to a slide position and the operation of a slide changer to present the slide to a viewing position. These various control apparatus are conrollable in either a manual mode or a random access mode. Arrangements of this type, for example, are disclosed in U.S. Pat. Nos. 3,296,727, 3,225,652, 3,299,554, 3,895,864, 3,907,414, 3,924,942, 3,566,370, 4,041,457, 3,510,215, 3,644,027, 3,733,122, 3,652,155, 3,623,803, 3,700,320 and 3,732,546.

While the above described control apparatus of the prior art are generally suitable for their intended use, it would be desirable to more accurately control slide tray positioning and to provide a slide tray position sensing arrangement that is selectively positionable between two detection positions for appropriate alignment and detection of the slide positions of two tray types having a different number of slide positions.

SUMMARY OF THE INVENTION

Accordingly, it is a principal object of the present invention to provide a selectively positionable slide tray position sensing arrangement for slide projector apparatus that is appropriately aligned with the path of travel of one of two coded position arrays in accordance with the slide tray type positioned on the slide projector apparatus.

It is another object of the present invention to provide a slide tray position sensing arrangement for slide projector apparatus that is selectively operable to detect the slide positions of two types of slide trays having different numbers of slide positions wherein the position sensing arrangement is selectively positioned for alignment with a respective coded aperture array that corresponds to the slide tray type positioned on the slide projector apparatus in response to predetermined structural differences between the two tray types, the coded aperture arrays moving in a manner correlated to movement of the slide tray.

It is yet another object of the present invention to provide a slide tray position sensing arrangement for slide projector apparatus that is selectively aligned with an appropriate coded position array in response to the respective slide tray type that is carried by the slide projector apparatus.

Briefly, these and other objects of the present invention are achieved by providing a slide tray position sensing arrangement for slide projector apparatus. The slide tray position sensing arrangement is arranged at a detection station. A coded aperture ring is provided that moves in a manner correlated to the movement of a slide tray turntable. The slide tray turntable carries the slide tray that holds the slides for projection and also functions as a tray transport arrangement. The coded aperture ring includes two circumferential arrays of apertures. Each of the apertures in the first array corresponds to a controlled slide position of a first tray type; e.g., an 80 slide position tray. Each of the apertures in the second array corresponds to a controlled slide position of a second tray type; e.g., a 140 slide position tray. The slide tray position sensing arrangement is responsive to a predetermined portion of a 140 slide position tray to selectively condition the position sensing arrangement to a second detection position in alignment with the path of travel of the second aperture array. The first detection position of the position sensing arrangement is aligned with the first aperture array for 80 slide position tray operation.

The invention both as to its organization and method of operation together with further objects and advantages thereof will best be understood by reference to the following specification taken in conjunction with the accompanying drawings.

DETAILED DESCRIPTION OF THE PREFERRED EMBODIMENT

Figure 1:
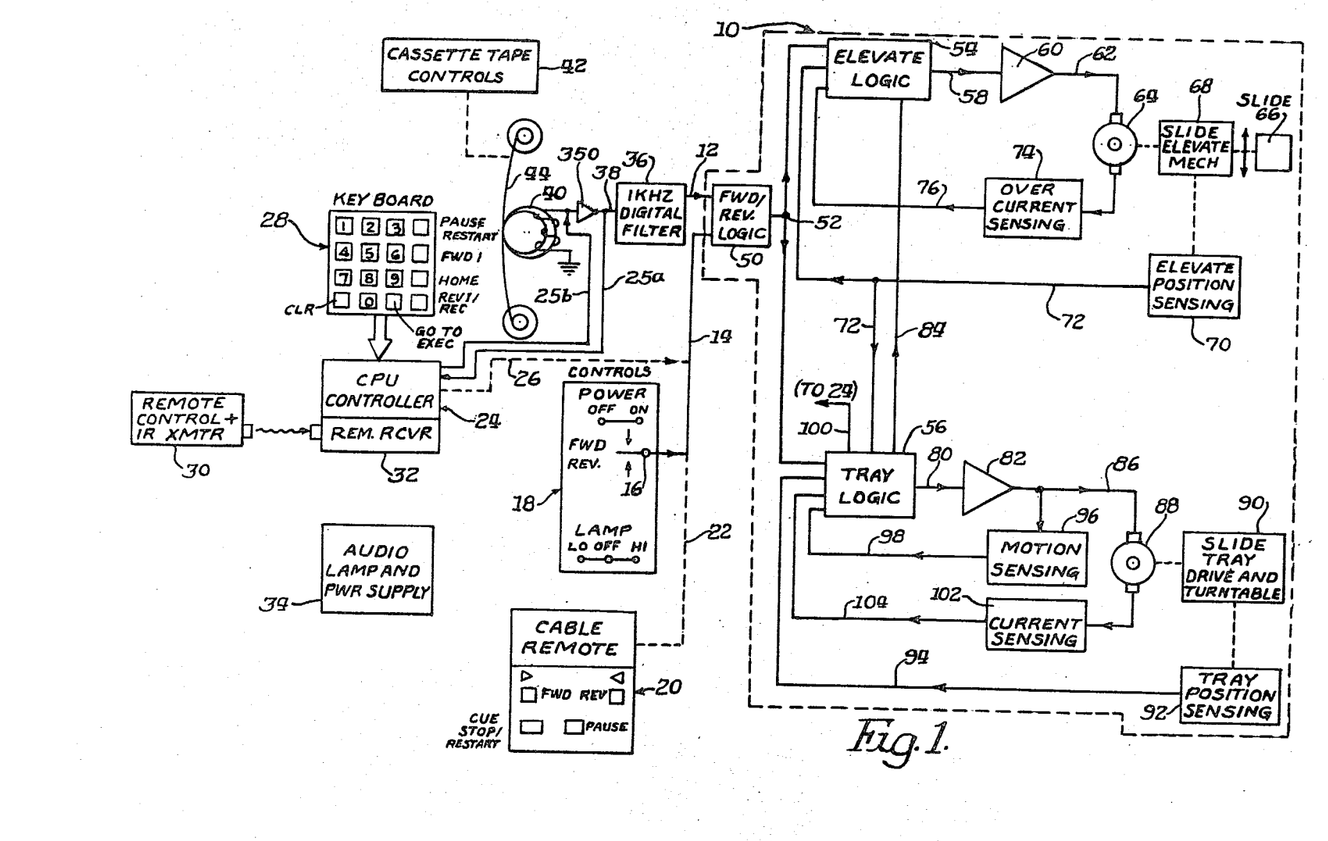
FIG. 1 is a block diagram representation of the slide tray position sensing arrangement and associated slide projector control apparatus of the present invention for operation of a slide projector.

Referring now to FIG. 1, the control apparatus 10 including the slide tray position sensing arrangement of the present invention for the control of a slide tray drive and slide change operation in a slide projector is illustrated in operable configuration with various controls of a slide projector. The control apparatus 10 in response to control signals at 12, 14 controls rotation of a slide tray carried by the projector and operation of a slide change mechanism to control movement of a slide adjacent the slide projection station between a viewing position and a slide tray position.

The control signals at 14 provide digital signals on one or more lines representing a forward or reverse mode of slide tray movement to which the control apparatus 10 is responsive to appropriately move the slide tray to a desired position. The control signal 12 represents a slide advance signal derived from a program tape to which the control apparatus 10 is responsive to advance the slide tray by one slide position in response to each occurrence of the signal 12.

While it should be understood that the control apparatus 10 of the present invention of FIG. 1 is operable to appropriately control slide tray movement and slide change operation in many different varieties of projector apparatus, the basic operation of the control apparatus 10 will be described in combination with the projector and associated control portions as illustrated in FIG. 1.

In one arrangement of the projection apparatus, the control signals at 14 are provided from a forward/reverse tray advance control switch 16 of a local control panel 18. The local control panel 18 also includes an on/off power switch and a lamp mode control switch. The control signals at 14 are also capable of being provided from a remote control unit 20 over a remote cable interconnection 22. The remote control unit 20 includes forward and reverse slide advance controls.

The advance control signal 12 is provided by a digital filter stage 36. The digital filter stage 36 receives an audio input 38 from a tape transducing head 40 through a preamplifier 350. The tape transducing head 40 is associated with a cassette tape arrangement including appropriate controls referred to generally at 42. A cassette tape 44 includes 1 KHz sinewave or encoded advance bursts that are decoded by the digital filter stage 36 to provide desired advance control signals at 12 in accordance with the desired program recorded on the cassette tape 44. The cassette tape 44 also includes recorded narrative information on a separate track from the track including the recorded advance burst information. The narrative track information is transduced and provided by audio circuitry in an audio, lamp, and power supply circuitry stage referred to generally at 34. Thus a synchronized narrative program and slide advance is provided in timed relationship.

In another arrangement of the projection apparatus of FIG. 1, a CPU controller 24 provides control signals at 14 over an interconnecting signal path 26. The CPU controller 24 is responsive to the inputs from a keyboard 28 to provide random access operation of the control apparatus 10. A desired slide number is inputted on the keyboard 28 and the CPU controller 24 determines the appropriate rotation of the slide tray by control apparatus 10 that is required to bring the desired slide to the slide changer viewing position as will be explained in more detail hereinafter. The CPU controller 24 is also responsive to encoded slide address signals on the cassette tape 44 defining specific slide numbers in the slide tray. The CPU controller decodes the encoded slide address signals on a data line 25a connected at the output of the preamplifier stage 350 and provides the control signals at 14 via the interconnecting signal path 26 for random access operation in accordance with the recorded program cassette tape.

The CPU controller 24 also provides for the encoding of program cassette tapes over a data line 25b connected to the output of the transducing head 40 in response to inputs from the keyboard 28 in a program record mode by recording the corresponding encoded slide address signals in a burst signal format on the program tape 44. Thus, in the arrangement of the projection apparatus utilizing a CPU controller 24, the digital filter stage 36 is not utilized and the output 12 is not functional; the CPU controller 24 performing all the required decoding of the encoded slide address signals on the program cassette tape 44.

In the arrangement of the projector apparatus utilizing a CPU controller 24, the forward/reverse control 16 of local control 18 is deleted and forward and reverse keys are provided on the keyboard 28. The projection apparatus with the CPU controller 24 is also operable to provide the control signals at 14 over the signal path 26 by means of a wireless remote control transmitter unit 30 and a receiver 32. The remote control transmitter 30 and receiver 32 operate, for example, on the basis of infrared energy transmission. The receiver 32 responds to the transmitted signals from the transmitter 30 and provides desired slide information as data signals to the CPU controller 24. In a specific arrangement, the remote control and transmitter unit 30 is provided with a keyboard such as the keyboard 28 such that complete functioning and control of the controller apparatus 10 is provided by the remote control transmitter unit 30. For a more detailed discussion of the operation of the CPU controller 24 and associated control functions, reference may be made to U.S. application Ser. Nos. 336,524 and 336,522 filed by R. Parker et al on Dec. 31, 1981.

The control apparatus 10 includes a forward/reverse logic stage 50 that is responsive to the mode advance control signals 12, 14. The forward/reverse logic stage 50 generates forward and reverse mode signals 52 to a slide elevate logic stage 54 and a slide tray logic stage 56 in accordance with the state of the input signals 12, 14. In response to a forward or reverse mode signal from the output 52, the elevate logic stage 54 is set to slide elevate mode and provides an output at 58 to a slide elevate motor drive amplifier 60. The motor drive amplifier 60 at output 62 drives the slide elevate motor 64 to elevate a slide 66 in the projection position to an upward slide tray position through operation of a slide elevate mechanism 68. The slide elevate mechanism 68 (not shown in detail) receives a unidirectional input from the slide elevate motor 64 to drive a reversible feed screw or endless worm arrangement similar in general respects to the drive arrangement of U.S. Pat. No. 3,353,443 and described in detail in U.S. application Ser. No. 336,470 filed by N. Mischenko on Dec. 31, 1981.

During normal steady state operation of the projector apparatus including initial power up of the system and between slide changes, the elevate logic 54 is conditioned with the slide elevate mechanism 68 in the downward slide projection position with a slide 66 in the projection position. Thus, for selection of a new slide for projection in the single slide advance mode, random access slide programming mode, or rapid search mode between various slide tray positions, the basic operational cycle begins with elevation of the particular slide presently in the projection position back into the upward tray position, and proceeds with the controlled rotation of the slide tray by one or more slide positions and finishes with the lowering of the desired slide for presentation into the projection position by operation of the slide elevate motor 64.

An elevate position sensing arrangement 70 is appropriately positioned proximate the slide elevate mechanism 68 and includes up and down limit sensing switches to detect predetermined movement of the slide elevate mechanism 68 between a predetermined tray position and a predetermined projection position at the slide elevation station. The elevate position sensing arrangement 70 provides outputs at 72 to the elevate logic stage 54 to terminate operation of the elevate signal 58 and thus appropriately drive the slide elevating mechanism 68 between the predetermined up and down positions. A current sensing stage 74 monitors current through the slide elevate motor 64 and provides at output 76 a disable control signal to the elevate logic stage 54 in the event of sensed current of an excessive value. The elevate logic stage 54 responds to an excessive current condition at 76 to terminate the drive signal to the slide elevate motor 64.

After the slide presently in the projection position has been elevated to the slide tray position, the control apparatus 10 proceeds to the slide tray movement mode wherein the slide tray is moved by one or more positions in an appropriate forward or reverse direction in response to the forward/reverse logic stage 50.

Specifically, the signal 72 from the elevate position sensing arrangment 70 is connected as an input to the slide tray logic stage 56. The slide tray logic stage 56 in response to the signal at 72 is conditioned to the tray drive mode. In response to the status of the forward or reverse mode signal 52 as an input to the slide tray logic stage 56, the slide tray logic stage 56 outputs at 80 an appropriate forward or reverse tray drive signal to a tray motor drive amplifier 82. The slide tray logic stage 56 also includes a mode select latch operable in either a forced mode or a servo mode. Thus, the slide tray logic stage 56 provides a mode control output 84 to disable the elevate logic stage 54 to insure disabling of the elevate function when the slide tray logic 56 is conditioned to the forced mode.

In response to the tray drive signal 80, the slide tray motor drive amplifier 82 at output 86 provides a drive signal of appropriate polarity to operate a slide tray motor 88 in either the forward or reverse direction. The slide tray motor 88 is operatively coupled to appropriately drive a slide tray drive and turntable arrangement 90 in the corresponding forward or reverse direction.

Figure 5:
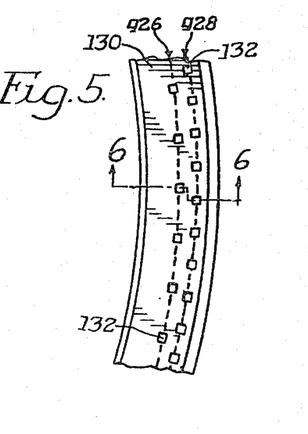
FIG. 5 is a fragmentary view illustrating the coded aperture ring and turntable of the control apparatus of FIGS. 1 and 2.
Figure 6:
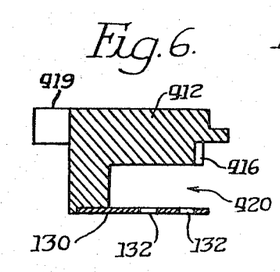
FIG. 6 is a sectional view taken along the line 6—6 of FIG. 5.

The slide tray drive and turntable arrangement 90 includes a circumferential apertured ring with one aperture corresponding to each respective slide tray position as illustrated in FIGS. 5 and 6 and described in more detail hereinafter. A slide tray position sensing arrangement 92 is disposed in the path of travel of the circumferential coded aperture ring of arrangement 90.

The slide tray position sensing arrangement 92 includes a light source and two photodetectors all as shown in more detail in FIGS. 2, 3, 4 and 7. The two photodetectors are arranged in predetermined spaced relationship along the circumferential path of travel of the aperture configuration so as to provide differential output sensing of each of the apertures as each respective aperture is moved within the operating range of the dual photodetectors. Dependent upon the direction of slide tray rotation, as the aperture approaches the dual photodetector station, one of the photodetectors will receive illumination of a higher magnitude than the other photodetector. Further, when the aperture is arranged directly over the midpoint between the two photodetectors, the photodetectors receive equal illumination through the aperture. The outputs at 94 from the differential photodetectors of the sensing arrangement 92 are connected to the slide tray logic stage 56 to provide appropriate servo loop feedback control signals to accurately position the slide tray in a desired position.

The control apparatus 10 by means of the slide tray logic stage 56 is operable in a first forced mode of operation in the tray drive mode during which the slide tray logic stage 56 by means of output signal 80 drives the slide tray motor 88 between one or more slide positions as dependent upon the input signal 52.

If the input signal 52 remains in either a high forward or reverse signal state, the slide tray logic 56 is maintained in a forced mode for rapid search or random access with movement of the slide tray and turntable between the present slide position and a desired slide position. When the control signal 52 is generated for a single slide advance in the forward or reverse direction, the forced mode of operation by means of the slide tray logic stage 56 and signal 80 provides for forced mode control movement of the slide tray between the present slide position and the next successive slide position.

The forced mode of operation is terminated for a single advance slide situation when the slide tray position sensing arrangement 92 by means of output signals 94 senses the next slide position. In response to the sensed condition at signal 94, the slide tray logic stage 56 terminates forced mode operation and is then operable in the servo mode of operation under the control of the outputs at 94 from the dual photodetector devices to accurately position the slide tray and turntable 90 at the next slide position. The forced mode of operation is similarly terminated and the servo mode of operation initiated during random access or rapid search situations after the control signal 52 is terminated and upon the next occurrence of the signal 94 from the slide tray position sensing arrangement 92.

The control apparatus 10 also includes a motion sensing stage 96 that is responsive to the slide tray motor control voltage 86 and that provides an output at 98 to the slide tray logic stage 56. The output at 98 indicates that the slide tray has moved, stopped and locked on to the appropriate slide tray position in the servo mode. The slide tray logic 56 responds to the input signal 98 and generates an output at 84 to the elevate logic 54 to set the elevate logic 54 to the enable mode to allow downward positioning of the slide by the elevate mechanism 68 to lower the slide at the elevate station into projection position after tray movement has terminated. Further, the slide tray logic stage 56 upon entering the servo mode has been disabled or reset from the tray drive mode.

The slide tray logic stage 56 outputs at 100 a slide count signal for use by projection apparatus including the CPU controller 24 to provide incremental slide position movement information to the controller 24. The incremental position signal 100 is provided to the CPU controller 24 since no absolute position information is available in the preferred embodiment of the tray position sensing arrangement of the control apparatus 10. Thus, in response to a known start position and the incremental position signals at 100, the CPU controller 24 stores the present position of the slide tray.

The control apparatus 10 also includes a tray drive motor current sensing stage 102 that monitors current through the slide tray motor 88 and provides an excessive current signal 104 to the slide tray logic stage 56. The slide tray logic stage 56 in response to the excessive current signal 104 terminates tray drive movement by terminating the tray movement signal 80.

Figure 2:
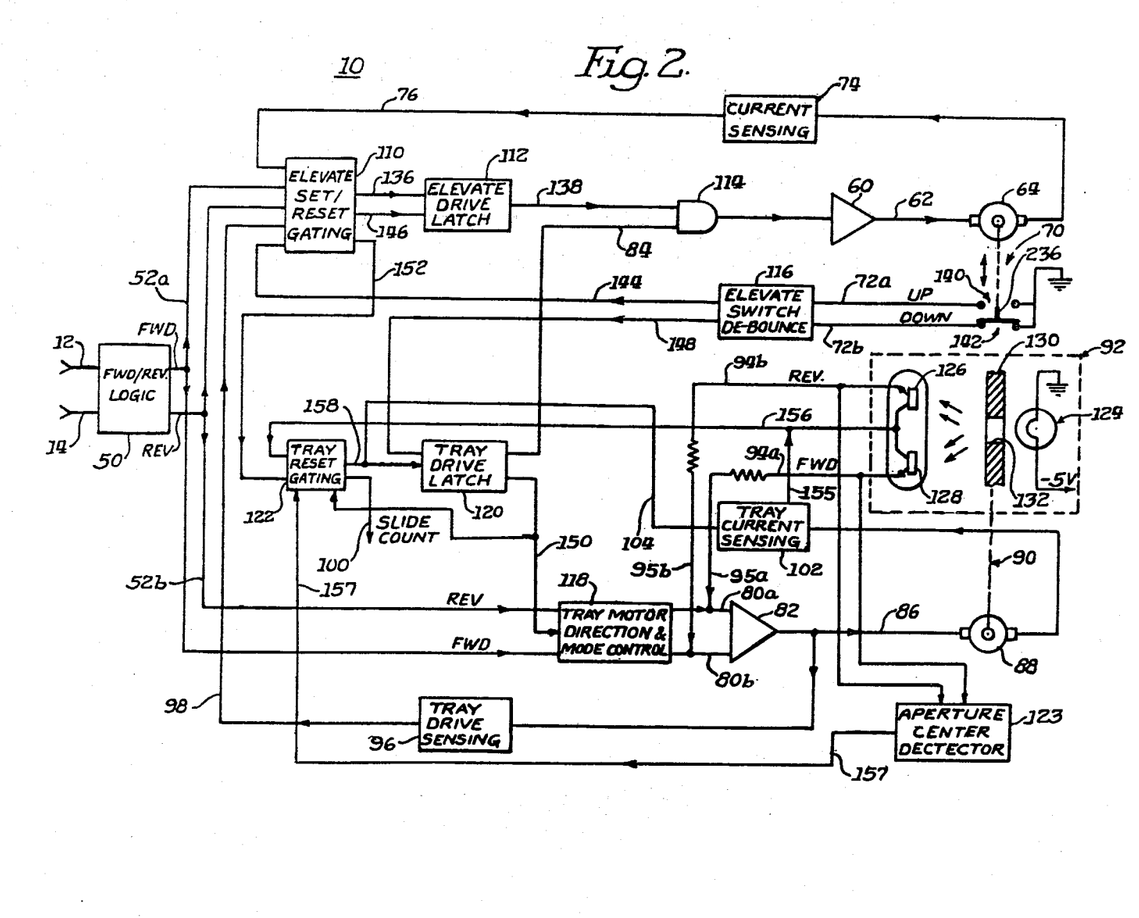
FIG. 2 is a more detailed block diagram representation of the control apparatus and slide tray position sensing arrangement of the present invention of FIG. 1.

Referring now to FIG. 2 and considering the detailed structure and operation of the control apparatus 10, the forward/reverse logic stage 50 in response to the input signals 12, 14 provides a forward mode signal 52a and a reverse mode signal 52b with either the forward or reverse signal being active as dependent upon the state of the input signals 12, 14. As illustrated in FIG. 2, the elevate logic stage 54 includes an elevate/reset gating stage 110, an elevate drive latch stage 112 and an elevate/tray interlock stage 114. Similarly, the slide tray logic 56 of FIG. 1 as illustrated in FIG. 2 includes a tray direction and mode control stage 118, a tray drive mode select latch 120, a tray reset gating stage 122, and an aperture center detector stage 123. Additionally, like elements in FIGS. 1 and 2 are designated by like reference numerals.

The slide tray position sensing arrangement 92 of FIG. 2 depicts the light source 124, in appropriate positional relationship with the dual photodetectors 126, 128. A partial edge view of the coded aperture ring of the turntable arrangement 90 is illustrated in operative position with the light source 124 and the two photodetectors 126, 128. An aperture 132 of the coded ring 130 is also shown in the aligned position midway between the photodetectors 126, 128 and aligned with the light source 124 corresponding to the at-rest, servo mode position wherein equal illumination is received by both photodetectors 126 and 128. The output 94a of the photodetector 128 is connected through a series resistor to provide the output signal 95a for connection with the forward drive signal 80a to the tray motor drive amplifier stage 82. The output 94a is also directly connected to the aperture center detector stage 123. Similarly, the output 94b of the photodetector 126 is connected through a series resistor to provide the output signal 95b for connection with the reverse drive signal 80b. The output 94b is also directly connected to the aperture center detector stage 123.

The elevate/reset gating stage 110 in response to an active signal on either the forward mode line 52a or the reverse mode line 52b sets the elevate drive latch 112 over line 136 to the elevate enable mode. With the elevate drive latch 112 in the elevate enable mode, an elevate drive signal output 138 of the latch 112 is coupled through an elevate/tray interlock gate 114 to activate the elevate motor drive 60 and thus provide movement of the elevate motor 64 to elevate a slide from the projection position to the slide tray position. The elevate/tray interlock stage 114 is implemented in a specific embodiment by an AND gate with the signal 138 as one input to the AND gate 114. The second input to the AND gate 114 is connected to the elevate mode enable signal 84 outputted from the tray drive mode select latch 120 of the slide tray logic 56.

Upon movement of the elevate motor 64 to move the slide up into the slide tray position, an up limit switch 140 of the elevate position sensing arrangement 70 is closed to provide a signal at 72a to the elevate switch debounce stage 116. The elevate position sensing arrangement 70 also includes a down limit sensing switch 142 which is closed when the elevate motor 64 moves the slide elevate mechanism 68 to the downward projection position with a corresponding down limit signal transition 72b being supplied to the elevate switch debounce stage 116.

The elevate switch debounce stage 116 in response to a closure of either switch 140 or 142 indicated by the respective input 72a, 72b provides a switch transition output signal 144 to the elevate/reset gating stage 110. The elevate/reset gating stage 110 in response to the switch transition signal at 144 provides an output signal at 146 to reset the elevate drive latch 112 to disable the elevate drive signal 138 thus terminating the upward slide elevate mode. The elevate switch debounce stage 116 in response to closure of the up limit switch 140 at input 72a also provides a switch transition signal at output 148 to set the tray drive mode select latch 120 to the tray drive mode.

The tray drive mode select latch 120 in response to the signal at 148 provides the disabling control signal 84 and further provides a tray drive enable signal 150 to the tray direction and mode control stage 118. When enabled by the tray drive signal 150, the tray direction and mode control stage 118 in accordance with either the forward mode signal 52a or the reverse mode signal 52b being active provides the appropriate corresponding forward drive signal 80a or reverse drive signal 80b to the tray motor drive amplifier 82 to actuate the tray motor 88 to move the slide tray. The tray drive enable signal 150 from the latch 120 also disables servo mode operation of the tray direction and mode control stage 118.

The elevate/reset gating stage 110 provides a forced mode sustaining signal 152 to the tray reset gating stage 122 in response to the active state of either the forward or reverse mode signals 52a or 52b respectively. It will be remembered that in a random access or rapid search mode, one of the corresponding mode signals 52a or 52b will remain active. On the other hand, in a single slide advance condition, the mode signals 52a or 52b will remain active for only a relatively short time duration and will be inactive during the remaining time in which the tray drive latch 120 is in the tray drive enable mode. Thus, if the forced mode sustaining signal 152 is active, the tray direction mode control stage 118 continues to provide either the forward drive signal 80a or the reverse drive signal 80b to the tray motor drive amplifier stage 82.

Thus, if the tray direction and mode control stage 118 is controlled in a rapid search or random access mode, one of the appropriate drive signals 80a or 80b is active to control operation of the slide tray motor 88 to move the slide tray drive and turntable 90 through the appropriate number of slide positions.

When the desired slide position is reached for either a single slide position advance or in the rapid search or random access mode, the drive signal 80a or 80b that is active is disabled by means of the termination of the drive signal 150. The drive signal 150 is terminated when the photodetectors 126, 128 become active ccoresponding to the positioning of the aperture 132 in the vicinity of the sensing arrangement 92 corresponding to the desired slide position such that light from the source 124 impinges upon the photodetectors 126, 128. Current to the photodetectors 126, 128 is sourced by means of a common supply line 156 from the tray reset gating stage 122.

The tray drive motor current sensing stage 102 provides a control output at 155. The control output at 155 is connected to the supply line 156 to adjust the voltage level at 156 in accordance with the frictional loading on the tray motor 88 as will be explained in more detail hereinafter in connection with FIG. 4. The control output 155 provides appropriate delay of the transition from the forced mode to the servo mode under varying load conditions.

When the photodetectors 126, 128 begin to conduct in response to light impinging thereon from the source 124 through the aperture 132, the tray reset gating stage 122 in response to the signal level at 156 provides a tray drive reset signal at 158 to reset the tray drive mode select latch 120 and terminate the signal 150. Further, if the elevate/reset gating stage 110 detects a continued force drive mode signal on either of the lines 52a or 52b corresponding to rapid search or random access mode, the signal 152 is active to prevent the tray reset gating stage 122 from generating the reset signal 158.

Thus, in the single advance slide situation or in the random access or rapid search mode after the desired position has been reached and the signals 52a, 52b are inactive, the forced mode signal of 80a or 80b is inactive and the servo mode signals 94a, 94b are active to accurately position and stop the slide tray in the desired aligned slide tray position with the slide in the corresponding slide tray position aligned with the slide elevate mechanism 68.

In the case of a single slide advance, the drive signal 150 is utilized by the tray reset gating stage 122 as a temporary servo mode inhibit signal. In this way, the servo mode is temporarily inhibited for a predetermined time interval after the occurrence of the drive signal 150 as will be explained in more detail hereinafter in connection with FIG. 4.

When the tray drive motion sensing stage 96 detects the appropriate sequence of control voltage changes at output 86 to the tray motor 88, the signal 98 is generated to the elevate/reset gating stage 110. In response to the signal 98, the elevate/reset gating stage 110 provides the latch enabling signal 136 to set the elevate drive latch 112 to the elevate mode.

Thus, the elevate drive latch 112 when set to the elevate mode provides the elevate enable signal 138 through the elevate tray interlock gate 114 to provide operation of the elevate motor 64 with the slide elevate mechanism in the up position to lower the slide to the down or projection position.

When the down limit switch 142 is actuated by the slide elevate mechanism 68 with the slide in the down projection position, the elevate switch debounce stage 116 in response to the switch transition at 72b provides the switch transition signal 144 to the elevate/reset gating stage 110 which in turn by means of output 146 resets the elevate drive latch 112 to terminate elevate operation. At this point the stable, steady state operating condition of the control apparatus 10 has been reached with the desired slide in the projection position. The control apparatus 10 now remains in this state until another slide advance control is received by the forward/reverse logic stage 50.

The tray reset gating stage 122 provides the slide count pulse signal at 100 for the CPU controller 24 (where utilized) at the time when the current through line 156 is detected which indicates the approach of an aperture.

The aperture center detector stage 123 in response to the photodetector output signals 94a, 94b provides at output 157 a pulse control signal to the tray reset gating stage 122. The pulse control signal at 157 is utilized by the tray reset gating stage 122 under high frictional loading conditions of the tray drive motor 88 to ensure initiation of the servo mode and termination of the forced mode. Reference may be made to U.S. application Ser. No. 336,523 filed by R. Parker et al on Dec. 31, 1981 for a more detailed discussion of the operation and structure of a specific embodiment of the control apparatus 10.

Referring now to FIGS. 3, 4, 5 and 6, the slide tray drive and turntable arrangement 90 and the slide tray position sensing arrangement 92 are illustrated in operative relationship. The turntable 412 carries the circumferential coded aperture ring 130 shown in more detail in FIGS. 5 and 6. The slide tray position sensing arrangement 92 is slidably carried by the housing 414 of the projector apparatus. The turntable 412 is carried by the housing 414 for rotary movement relative thereto. A gear ring 416 is integrally provided on the turntable 412 for engagement by a drive gear (not shown) driven by the slide tray motor 88. A slide tray 410 positioned atop the projection apparatus includes a registration notch 417 (FIG. 4) formed in the outer lip portion 418. The registration notch 417 interfits with a cooperating nose portion 419 of the turntable 412 for driving of the slide tray 410 by the turntable 412 and to provide proper registration of slide tray position with the turntable. Since the turntable 412 and the tray position sensing arrangement 92 provide only incremental slide position information, a zero position registration switch (not shown) is provided adjacent an actuating portion of the turntable 412 to provide zero absolute starting position information to the control apparatus 10 and the CPU controller 24.

The turntable 412 with the attached aperture ring 130 provides a circumferential space or cavity 420 (FIG. 6). The position sensing arrangement 92 includes a light pipe 422 (FIGS. 3 and 4) that cooperates with the light source 124 and extends into the cavity 420 for directing light from the source 124 onto the aperture ring 130. The photodetectors 126, 128 are mounted in the position sensing arrangement 92 in a common detector module 424 immediately below the aperture ring 130.

Figure 3:
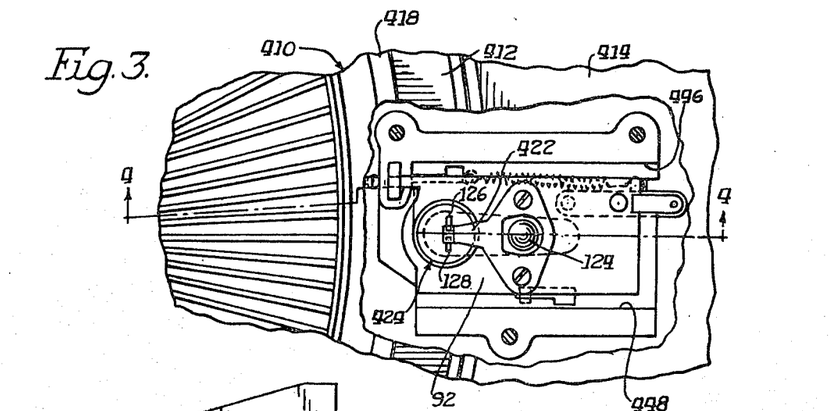
FIG. 3 is a plan view of portions of the slide projector of FIGS. 1 and 2 with portions cut away for clarity and illustrating the turntable carrying the slide tray, the coded aperture slide position ring and the slide tray position sensing arrangement of the present invention.
Figure 4:
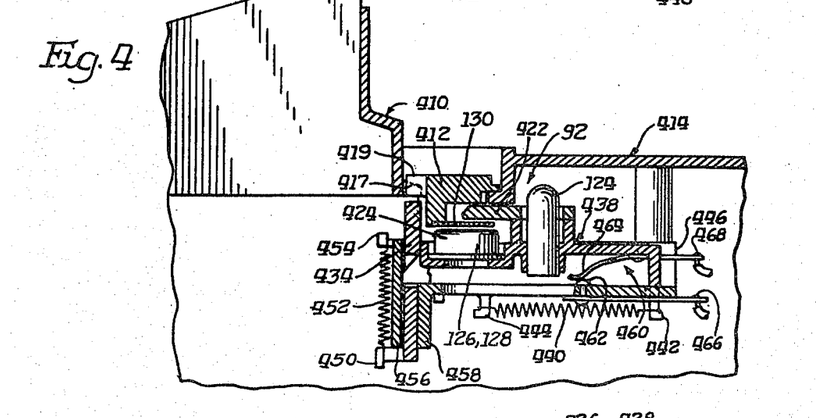
FIG. 4 is a sectional view taken along the line 4—4 of FIG. 3.
Figure 7:
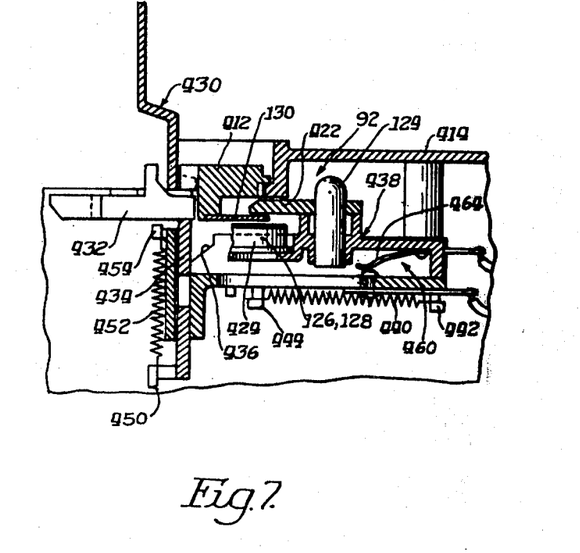
FIG. 7 is a sectional view similar to FIG. 4 and illustrating operation of the slide position sensing arrangement with a different slide tray type.

The aperture ring 130 includes a first circumferential array 426 of apertures 132 including 81 apertures appropriately and equally spaced to correspond to the 81 positions of an 80 slide tray 410. The aperture ring also includes a second circumferential array 428 of apertures 132 including 141 apertures appropriately and equally spaced to correspond to the 141 positions of a 140 slide tray 430 (FIG. 7). With the 80 slide tray 410 in position as shown in FIGS. 3 and 4, the first array 426 of apertures 132 is directly aligned over the photodetectors 126, 128 as the slide tray 410 and the turntable 412 are rotated.

In a specific embodiment the photodetectors 126, 128 are implemented by chips that are each 0.050 by 0.165 inches arranged with the 0.165 dimensions along the circumferential path of travel of the aperture array 426. The detector module 424 provides a 0.020 inch space between the adjacent chips. Further, the apertures 132 are 0.070 by 0.070 inch formed in a stainless steel aperture ring 130.

Referring now to FIG. 7, a commercially available 140 slide tray 430 conventionally includes a downwardly extending portion 432 provided as a portion of a tray release mechanism. The movable sensing arrangement 92 includes a spring biased cam actuator 434 that is actuated by the extending portion 432. Upon downward movement of the cam actuator 434, the cam actuator operates a cam surface 436 of a spring biased platform 438 carrying the light source 124, the detector module 424 and the light pipe 422 of the position sensing arrangement 92. Thus, the movable platform 438 is positioned to the right in FIG. 7 into the 140 slide tray sensing position in response to the operation of the cam actuator 434 by the extending portion 432.

The position sensing arrangement 92 in the 140 slide tray sensing position of FIG. 7 accurately aligns the photodetectors 126, 128 with the path of travel of the aperture array 428. Thus, the photodetectors 126, 128 are appropriately positioned to cooperate with the apertures 132 of the 141 aperture array 428 to provide feedback signals to the control apparatus 10 for 140 slide tray position sensing and servo operation as discussed hereinbefore.

The movable platform 438 of the position sensing arrangement 92 is normally biased to the 80 slide tray sensing position by means of a spring 440 connected between an extending hook portion 442 of the platform 438 and an extending hook portion 444 of a U-shaped channel housing generally referred to at 446, 448 and mounted to the housing 414. The platform 438 is slidably mounted for movement within the U-shaped channel housing 446, 448. The cam actuator 434 is formed with an aperture to allow receiving of the cam surface 436 of the platform 438. The lower portion of the cam actuator 434 includes an extending hook portion 450. A spring 452 is connected between the hook portion 450 and an extending hook portion 454 of the U-shaped channel housing 446, 448 so as to bias the cam actuator 434 to the upward position. The cam actuator 434 is slidably mounted within the U-shaped channel housing 446, 448 between the respective upper and lower positions of FIGS. 4 and 7 within the channel formed by housing portions 456, 458.

A switch contact arrangement 460 provides a closed circuit to the control apparatus 10 when the slide tray position sensing arrangement is in the 140 slide tray position and an open circuit when the sensing arrangement is in the 80 slide tray position. The switch contact arrangement 460 includes a first fixed contact 462 carried by the lower housing portion 458. A movable spring contact arm 464 is carried by the movable platform 438. The spring contact arm 464 is arranged to contact the fixed contact 462 whenever the platform 438 is moved to the 140 slide tray position as shown in FIG. 7. The fixed contact arm 462 and the spring contact arm 464 are respectively connected to output signal connections 466, 468 for use by the control apparatus 10.

While there has been illustrated and described several embodiments of the present invention, it will be apparent that various changes and modifications thereof will occur to those skilled in the art. For example, while one embodiment of the slide tray position sensing arrangement 92 has been illustrated utilizing one source 124 and two photodetectors 126, 128, it should also be realized that another embodiment includes a single photodetector and two alternately energized light sources as disclosed in U.S. application Ser. No. 336,469 filed by R. Starai on Dec. 31, 1981 to which reference may be made for a more detailed discussion. It is intended in the appended claims to cover all such changes and modifications as fall within the true spirit and scope of the present invention.

What is claimed as new and desired to be secured by Letters Patent of the United States is:

1. In a position sensing arrangement for sensing the position of a slide tray transport arrangement of a slide projector, the position sensing arrangement including a coded array arrangement arranged for movement in a manner directly correlated to movement of the slide tray transport arrangement, the coded array arrangement including two planar arrays of energy transmissive members arranged in respective predetermined patterns, a first one of the arrays corresponding to a first predetermined plurality of positions of a first type of slide tray, the second of the arrays corresponding to a second predetermined plurality of positions of a second type of slide tray, the position sensing arrangement further including a position detection arrangement for detecting the position of the coded array arrangement, the position detection arrangement including an energy generating source and an energy detection arrangement, the energy generating source and the energy detection arrangement being disposed in a generally aligned condition at a predetermined detection station and on opposite sides of the coded array arrangement, wherein the improvement comprises the position detection arrangement comprising selectively positionable means being responsive to a predetermined portion of a tray of the second tray type for positioning the position detection arrangement to an aligned position with the second array when a tray of the second tray type is placed on the slide tray transport arrangement.

2. The position sensing arrangement of claim 1 wherein said coded array arrangement comprises a generally planar member and said energy transmissive members of said arrays are apertures formed through said coded array arrangement.

3. The position sensing arrangement of claim 2 wherein said energy generating source comprises a light source and said energy detection arrangement comprises a photodetector device.

4. The position sensing arrangement of claim 1 wherein said selectively positionable means comprises actuator means responsive to said predetermined portion of a tray of said second tray type and further comprises movable member means responsive to said actuator means and carrying said energy generating source and said energy detection arrangement.

5. The position sensing arrangement of claim 4 wherein said actuator means is slidably mounted for movement in a first predetermined direction when said actuator means is contacted by said predetermined portion of a tray of said second tray type, said movable member means being slidably mounted for movement in a second predetermined direction generally transverse to said first predetermined direction by the contact of said actuator means against said movable member means.

6. The position sensing arrangement of claim 5 wherein said movable member means includes a cam surface for engagement by said actuator means.

7. The position sensing arrangement of claim 6 wherein said predetermined portion of said second tray type distinguishes said second tray type from said first tray type.

8. The position sensing arrangement of claim 7 wherein said predetermined portion of said second tray type comprises a portion of the tray release mechanism to allow rotation of the slide positions within the slide tray.

9. The position sensing arrangement of claim 1 wherein said coded array arrangement is a generally planar member having a circular perimeter and each of said arrays forms a generally circumferential ring, said position detection means being movable generally parallel to the plane of said planar ring.

10. The position sensing arrangement of claim 1 wherein said position detection arrangement is movable between a first position in alignment with said first array and a second position in alignment with said second array.

11. The position sensing arrangement of claim 4 further comprising switch means for providing an output state indicative of the positions of said movable member means.

12. The position sensing arrangement of claim 11 wherein said switch means comprises one contact member carried by said movable member means and a second contact member carried by a fixed portion of said slide projector, said contact members being connected when said movable member means is in said second position.

13. The position sensing arrangement of claim 12 wherein said one contact member comprises a spring arm arranged to contact said second contact member when said movable member means is in said second position.

14. The position sensing arrangement of claim 1 wherein said first tray type is an 80 slide tray and said second tray type is a 140 slide tray.

15. In a slide projector having a slide tray turntable and control apparatus for controlling the movement of the slide tray turntable between a plurality of predetermined positions corresponding to respective slide positions of a slide tray capable of being carried by the turntable, the control apparatus including a coded position member having at least two arrays of apertures disposed thereon and being movable in a manner directly correlated to movement of the turntable, each of the arrays corresponding to a tray type that includes a different predetermined plurality of slide positions and each of the apertures corresponding to a respective one of the slide positions of the slide trays, the control apparatus also including at least one photodetector device and at least one light source device disposed on opposite sides of the coded position member, wherein the improvement comprises:

a movable member carrying the photodetector device and the light source and being movable between a first position aligned for detection of the first array for use with a slide tray of a first type and a second position aligned for detection of the second array for use with a slide tray of a second type, and actuator means responsive to a predetermined portion of a slide tray of said first type for controlling movement of said movable member from said second position to said first position, said predetermined portion of said slide tray of said first type not being present on slide trays of said second type.

16. A tray sensing arrangement for slide projector apparatus having a slide tray transport arrangement, a position coded arrangement for two types of slide trays having different predetermined numbers of slide positions and position detection apparatus responsive to the position coded arrangement for sensing the position of each slide tray transport arrangement, the tray sensing arrangement comprising:

means for carrying the position detection apparatus and for selectively aligning said position detection apparatus with respect to the position coded arrangement, said selectively aligning means being movable between two controlled positions corresponding to the respective aligned positions between the position detection apparatus and the position coded arrangement, and means responsive to predetermined structural characteristics of the two different tray types for controlling the position of said selectively aligning means.

* * * * *